(12) United States Patent
Ogata et al.

(10) Patent No.: US 12,542,053 B2
(45) Date of Patent: Feb. 3, 2026

(54) INFORMATION PROVISION SYSTEM, METHOD FOR PROVIDING PASSENGER VEHICLE INFORMATION, AND RECORDED PROGRAM MEDIUM

(71) Applicant: NEC Corporation, Tokyo (JP)

(72) Inventors: Kazuki Ogata, Tokyo (JP); Tetsuro Hasegawa, Tokyo (JP); Hiroaki Aminaka, Tokyo (JP); Kosei Kobayashi, Tokyo (JP); Kei Yanagisawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 209 days.

(21) Appl. No.: 18/283,327

(22) PCT Filed: Mar. 24, 2021

(86) PCT No.: PCT/JP2021/012155
§ 371 (c)(1),
(2) Date: Sep. 21, 2023

(87) PCT Pub. No.: WO2022/201347
PCT Pub. Date: Sep. 29, 2022

(65) Prior Publication Data
US 2024/0054888 A1    Feb. 15, 2024

(51) Int. Cl.
G08G 1/00    (2006.01)
G08G 1/01    (2006.01)
G08G 1/017   (2006.01)

(52) U.S. Cl.
CPC ......... *G08G 1/0116* (2013.01); *G08G 1/0125* (2013.01); *G08G 1/0175* (2013.01)

(58) Field of Classification Search
CPC ... G08G 1/0116; G08G 1/0125; G08G 1/0175
See application file for complete search history.

(56) References Cited

U.S. PATENT DOCUMENTS

2014/0125502 A1* 5/2014 Wittkop ................. G08G 1/127
                                                  340/6.1
2015/0262006 A1* 9/2015 Yomogida .......... G06Q 30/0272
                                                  705/14.62
(Continued)

FOREIGN PATENT DOCUMENTS

JP    2000-331294 A    11/2000
JP    2005-182415 A    7/2005
(Continued)

OTHER PUBLICATIONS

International Search Report for PCT Application No. PCT/JP2021/012155, mailed on Jun. 8, 2021.

*Primary Examiner* — Truc M Do
(74) *Attorney, Agent, or Firm* — Sughrue Mion, PLLC

(57) ABSTRACT

An information provision system connected to a fixed point camera installed in an area to be serviced includes: using an image captured by the fixed-point camera(s), and identifying passenger vehicles passing on a road, distinguishing whether the passenger vehicle is empty or not using the image captured by the fixed-point camera(s), generating a map including a distribution of passenger vehicles in state by state within the service-target area using the results of the identification by the first and second identification part; and transmitting the map to a predetermined terminal.

20 Claims, 19 Drawing Sheets

(56) References Cited

U.S. PATENT DOCUMENTS

| | | | | |
|---|---|---|---|---|
| 2017/0286780 A1* | 10/2017 | Zhang | ................ | G06F 18/2148 |
| 2018/0096599 A1* | 4/2018 | Nagao | .................... | B61L 27/57 |
| 2018/0170349 A1* | 6/2018 | Jobson | ..................... | B60L 7/18 |
| 2020/0184237 A1* | 6/2020 | Sakurada | ................ | H04W 4/38 |
| 2022/0301430 A1* | 9/2022 | Sudo | ...................... | H04N 7/183 |
| 2023/0140349 A1* | 5/2023 | Chand | ................... | G06V 20/52 |
| | | | | 701/117 |

FOREIGN PATENT DOCUMENTS

| | | | |
|---|---|---|---|
| JP | 2006-338465 | A | 12/2006 |
| JP | 2009-054072 | A | 3/2009 |
| JP | 2018-163578 | A | 10/2018 |
| JP | 2019-106149 | A | 6/2019 |
| JP | 2020-095410 | A | 6/2020 |
| JP | 2021-026627 | A | 2/2021 |

* cited by examiner

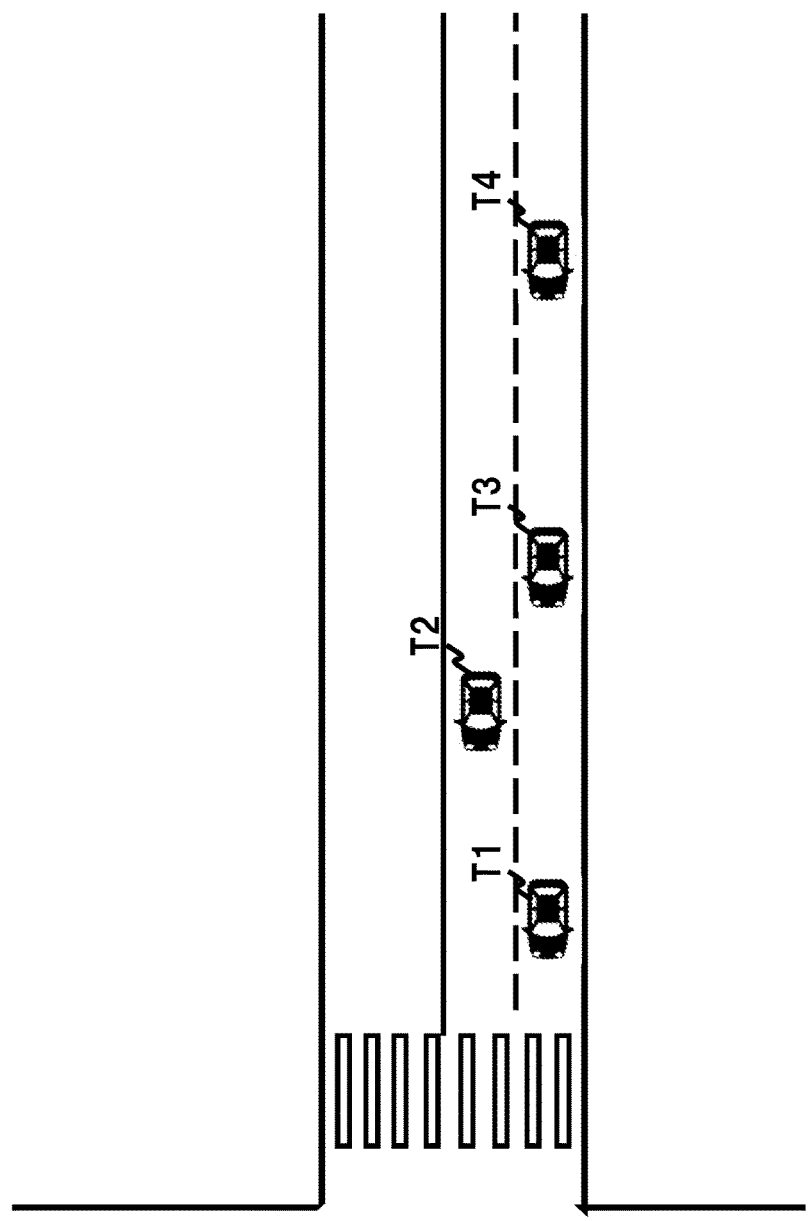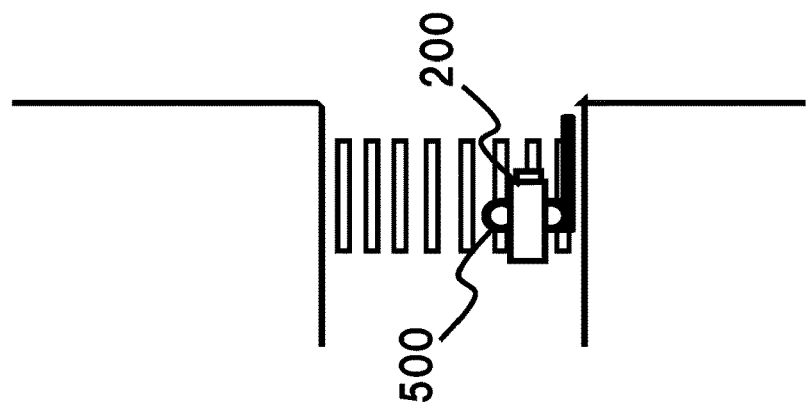
FIG. 5

FIG. 10

| MEASUREMENT DATE AND TIME | EMPTY PASSENGER VEHICLE TRAVELING FREQUENCY | MEASUREMENT SECTION |
|---|---|---|
| 2021/3/3 13:00-14:00 | 10 | INTERSECTION A- INTERSECTION B |
| 2021/3/3 14:00-15:00 | 20 | INTERSECTION A- INTERSECTION B |
| 2021/3/3 15:00-16:00 | 25 | INTERSECTION A- INTERSECTION B |
| 2021/3/3 16:00-17:00 | 10 | INTERSECTION A- INTERSECTION B |
| .. | .. | .. |

INFORMATION PROVISION SYSTEM, METHOD FOR PROVIDING PASSENGER VEHICLE INFORMATION, AND RECORDED PROGRAM MEDIUM

This application is a National Stage Entry of PCT/JP2021/012155 filed on Mar. 24, 2021, the contents of all of which are incorporated herein by reference, in their entirety.

FIELD

The present invention relates to an information provision system, a method for providing passenger vehicle information, and recorded program medium.

BACKGROUND

PTL (Patent Literature) 1 discloses a server that generates and transmits to a mobile terminal information on vacant passenger vehicles in the vicinity, which represents the location of vacant passenger vehicles, from the captured images collected from an in-vehicle device. The information providing part is described as being equipped with an information providing part that sends the vacant vehicle information having a vacant vehicle location corresponding to a location of the portable terminal obtained from the portable terminal to the portable terminal.

PTL 2 discloses a pick-up reservation system that presents available taxies to the user and allows the user to specify any taxi among them to make a pick-up reservation. In this document, the system receives pick-up availability status and current location from the in-vehicle terminal of taxies.

[Patent Literature 1] Japanese Patent Kokai Publication No. 2020-95410

[Patent Literature 2] Japanese Patent Kokai Publication No. 2006-338465

SUMMARY

The following analysis is given by the inventors. The method of the PTL 1 has a problem that it is not possible to create an empty vehicle map that is reliable enough unless a sufficient number of in-vehicle devices that have an imaging function and can communicate with a server are running and are distributed in certain fixed number. For example, during late-night hours when traffic volume is low, the number of in-vehicle devices capable of transmitting captured images to the server will be extremely small, and passenger vehicles may not be captured.

Although the method of the PTL2 eliminates the above problem, it has a problem that it is impossible to accurately determine the number and arrangement of empty passenger vehicles in an area unless all passenger vehicles are equipped with a corresponding function in their in-vehicle terminals.

It is a purpose of the present invention to provide an information provision system, a method of providing passenger vehicle information, and a program recording medium that can provide more accurate passenger vehicle information to users, irrespective of the distribution of in-vehicle devices and the existence/nonexistence of functions.

According to a first aspect of the present invention, there is provided an information provision system comprising: a first identification part that is connected to a fixed-point camera(s) installed in a service-target area and identifies passenger vehicle(s) traveling on a road using an image(s) captured by the fixed-point camera(s), a second identification part that distinguishes whether or not the passenger vehicle is empty using the image(s) captured by the fixed point camera(s), a map generating part that generates a map including a distribution of passenger vehicles in state by state within the service-target area using the results of the identification by the first and second identification part; and a transmitting part that transmits the map to a predetermined terminal.

According to a second aspect of the present invention, there is provided a method for providing information of passenger vehicles, wherein the method comprises:

with a fixed-point camera(s) installed in a service-target area; and an information provision system connected to the fixed-point camera(s), identifying a passenger vehicle(s) traveling on a road using an image(s) captured by the fixed-point camera(s); distinguishing a state of the passenger vehicle(s) whether or not it is empty using the image(s) captured by the fixed point camera(s); generating a map that can display distribution of passenger vehicles in state by state in the service-target area using the information identifying the passenger vehicles and the state of whether or not the passenger vehicle is empty; and transmitting the map to a predetermined terminal. The method is associated with a particular machine, that is, an information provision system that is connected to a fixed-point camera(s) installed in the service-target area, and transmits the map described above to a given terminal.

According to a third aspect of the present invention, a computer program for realizing the functions of the information provision system described above (hereinafter referred to as "the program") is provided. The computer program is input to a computer equipment via an input device or external communication interface, stored in a memory device, and drives a processor according to predetermined steps or processes. The program can also display the results of the processing(s), including intermediate states, step by step via a display device if necessary, or can communicate with the outside world via a communication interface. A computer device for this purpose is, as an example, typically equipped with a processor, a storage device, an input device, a communication interface, and a display device if necessary, which can be connected to each other by a bus. The program can also be recorded on a computer-readable (non-transitory) storage medium. That is, the invention can also be realized as a computer program product.

According to the present invention, it is possible to provide more accurate passenger vehicle information to users, irrespective of the distribution of in-vehicle devices and the existence/nonexistence of the functions.

BRIEF DESCRIPTION OF DRAWINGS

FIG. 5 is a flow chart illustrating operations of the information provision server of the first example embodiment of the invention.

FIG. 10 is an example of empty vehicle traveling frequency information held by an information provision server of the second example embodiment of the invention.

EXAMPLE EMBODIMENTS

Figure 1:
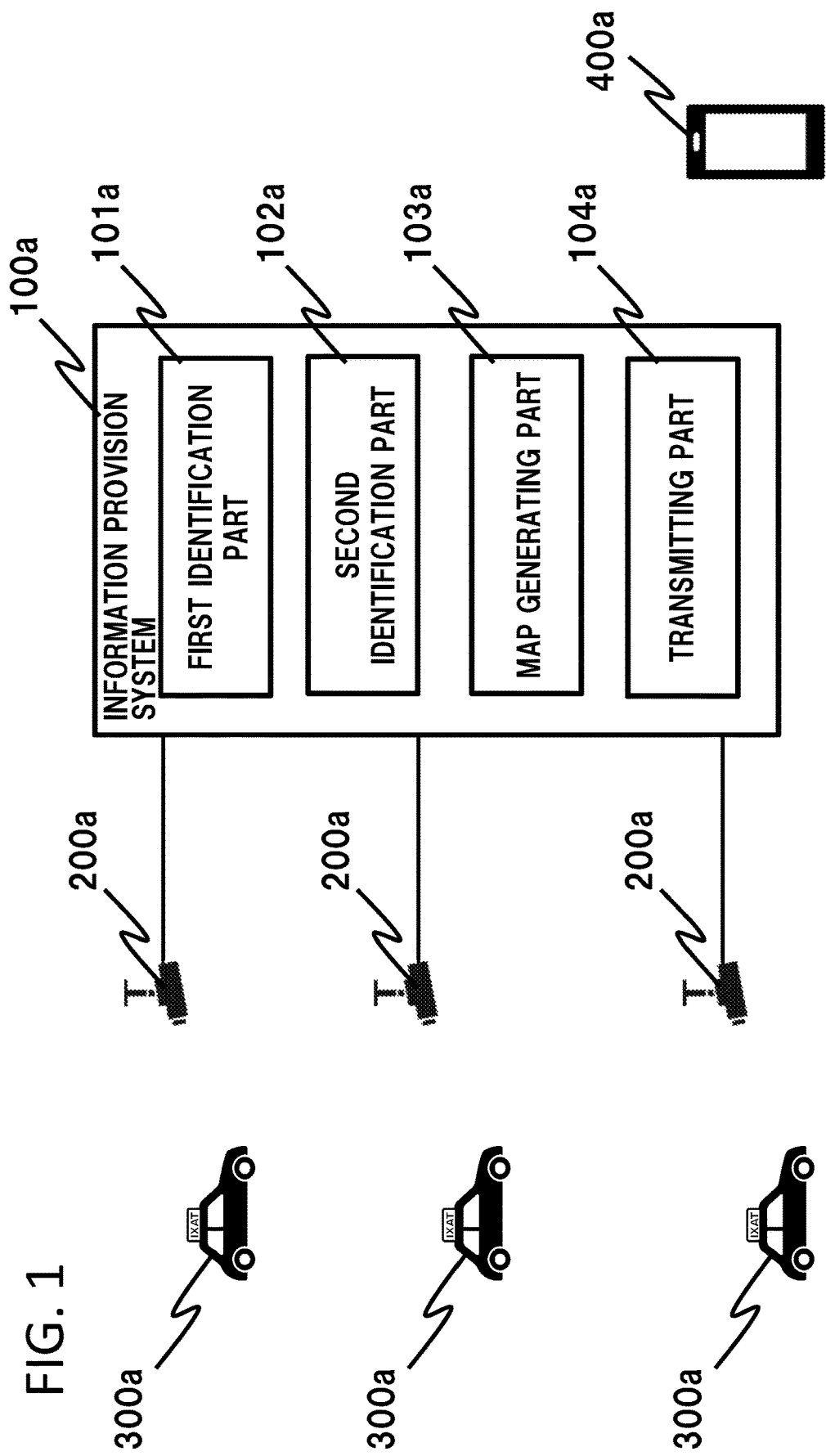
FIG. 1 is a diagram illustrating a configuration of one example embodiment of the invention.

First, an outline of one example embodiment of the present invention will be described with reference to drawings. Namely, drawing reference signs attached to this outline are for the sake of convenience and as an example to aid in understanding, and are not intended to limit the present invention to the manner illustrated in the drawings. The connecting lines between blocks in the drawings and other documents referred to in the following description include both bi-directional and uni-directional lines. As for the unidirectional arrow, it is intended to schematically show a flow of a main signal (data), and does not exclude bidirectionality. Ports or interfaces are present at the input/output connection points of each block in figures, but are omitted from the figures. The program is executed via a computer device, which is equipped with, for example, a processor, a memory device, an input device, a communication interface, and a display device if necessary. The computer device is also configured to be capable to communicate with devices (including computers) within or outside the device via the communication interface, irrespective of wired or wireless.

In its example embodiment, the invention can be realized by an information provision system 100a connected to a fixed-point camera(s) 200a installed in a service-target area, as shown in FIG. 1. More concretely, this information provision system 100a is equipped with first identification part 101a, second identification part 102a, map generating part 103a, and transmitting part 104a.

The first identification part 101a identifies passenger vehicles 300a traveling on road using image(s) captured by the fixed-point camera(s) 200a.

The second identification part 102a identifies a status of whether or not the passenger vehicle 300a is in an empty passenger vehicle status using images(s) captured by the fixed-point camera(s) 200a.

Map generating part 103a uses information identified by the first and second identification part 101a and 102a to generate a map capable of displaying distribution of passenger vehicles in state by state in a service-target area in which service is to be given.

Transmitting part 104a transmits the map to a predetermined terminal 400a.

For example, the map generating part 103a uses information identified by the first and second identification part 101a and 102a to obtain a distribution of passenger vehicles 300a in an empty status in a service-target area. The map generating part 103a then plots locations of the empty passenger vehicles on a map of the service-target area, thereby generating a map capable of displaying the distribution of passenger vehicles in state by state (i.e., per each state) within the service-target area.

Figure 2:
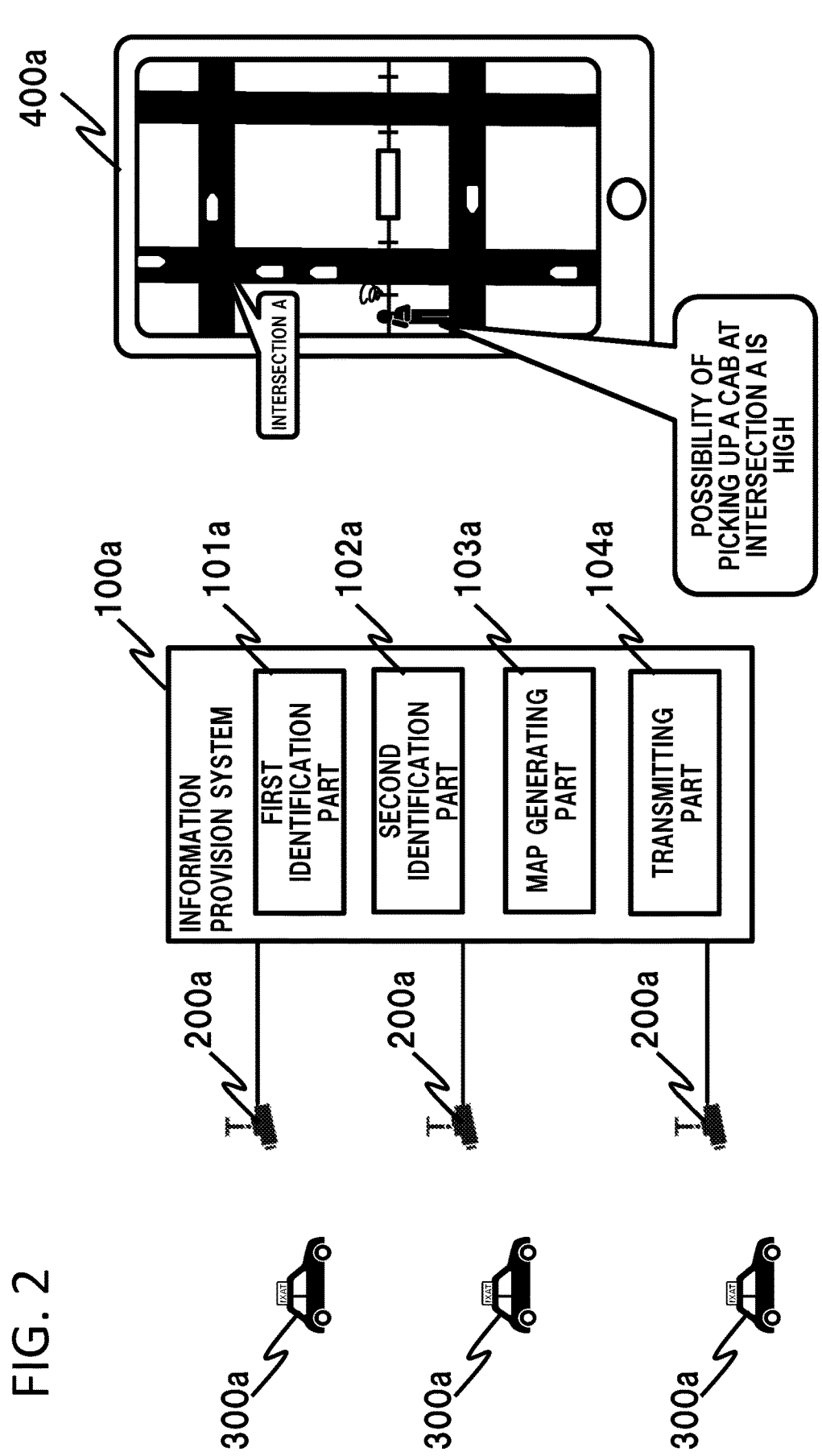
FIG. 2 is a diagram illustrating an operation of one example embodiment of the invention.

Transmitting part 104a transmits the map generated as described above to a predetermined terminal 400a. Here, the predetermined terminal 400a may be a smartphone or mobile terminal of a taxi-user, a terminal of a taxi-operator, an in-vehicle terminal of a private taxi-operator, or the like. For example, as illustrated in FIG. 2, by displaying the map on smartphone of a taxi-user, the taxi-user can grasp where in the vicinity the taxi-user is likely to pick up a taxi. For example, in the example shown in FIG. 2, since empty passenger vehicles are concentrated at intersection A, the taxi-user can easily find an empty passenger vehicle by approaching intersection A.

Such a map as described above could also be useful information for terminals of taxi-company and private taxi-operators. For taxi-operators and private taxi-companies, since they can find out distribution of empty passenger vehicles, they can take measures such as changing the route of their so-called "idle-traveling business" or dispatching backup vehicles, or the like.

First Example Embodiment

Figure 3:
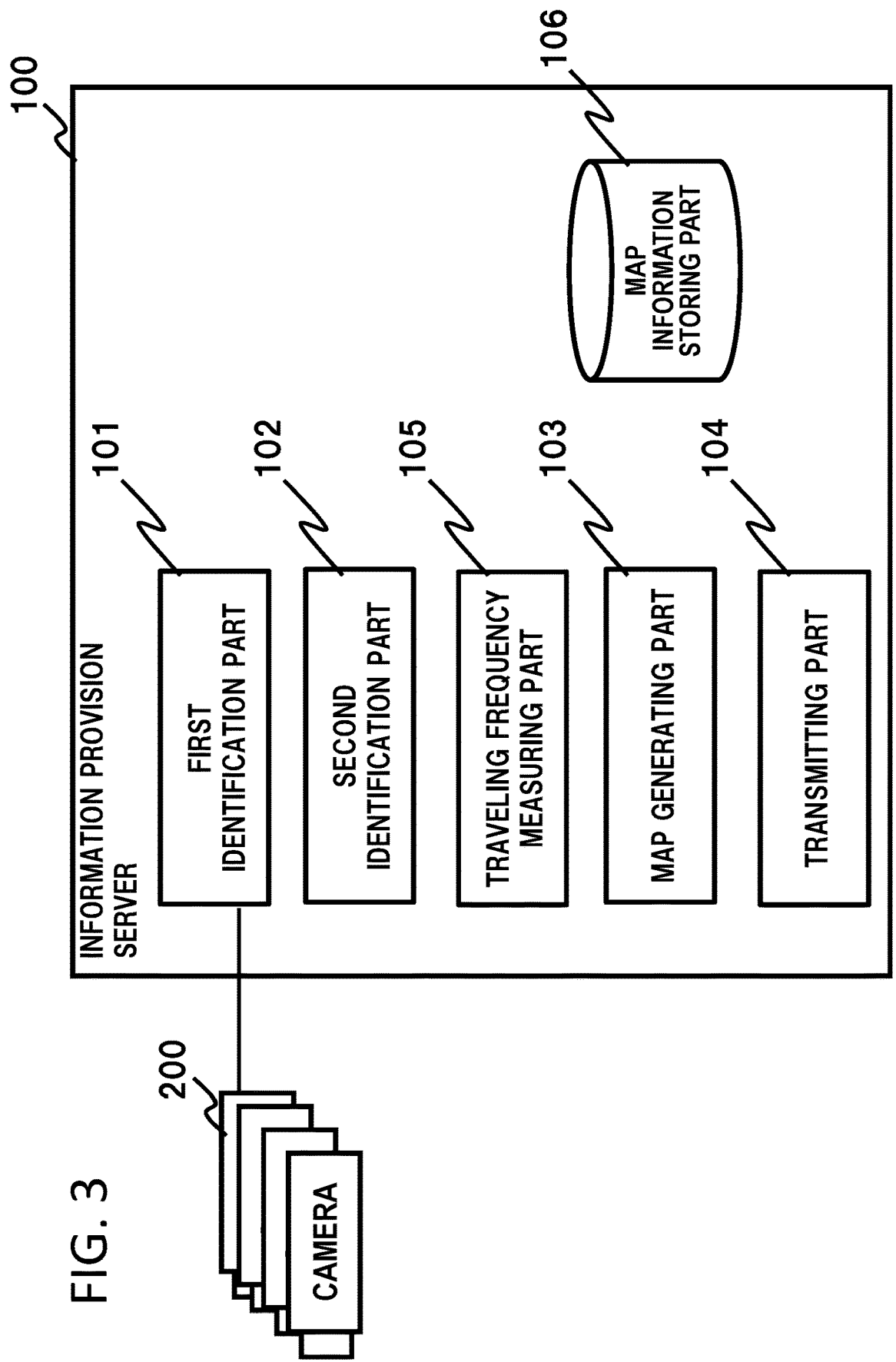
FIG. 3 is a block diagram illustrating a configuration of an information provision server in a first example embodiment of the invention.

Next, a first example embodiment of the invention will be described in detail with reference to the drawings. FIG. 3 is a block diagram showing a configuration of an information provision server of the first example embodiment of the invention. FIG. 3 shows a configuration of an information provision server 100 connected to a plurality of fixed-point cameras 200. The information provision server 100 has a first identification part 101, a second identification part 102, a traveling frequency measuring part 105, a map generating part 103, a transmitting part 104, and a map information storing part 106. The information provision server 100 can be realized by a server located on a cloud infrastructure or a MEC (Multi-access Edge Computing) server located near a service provision area.

Figure 4:
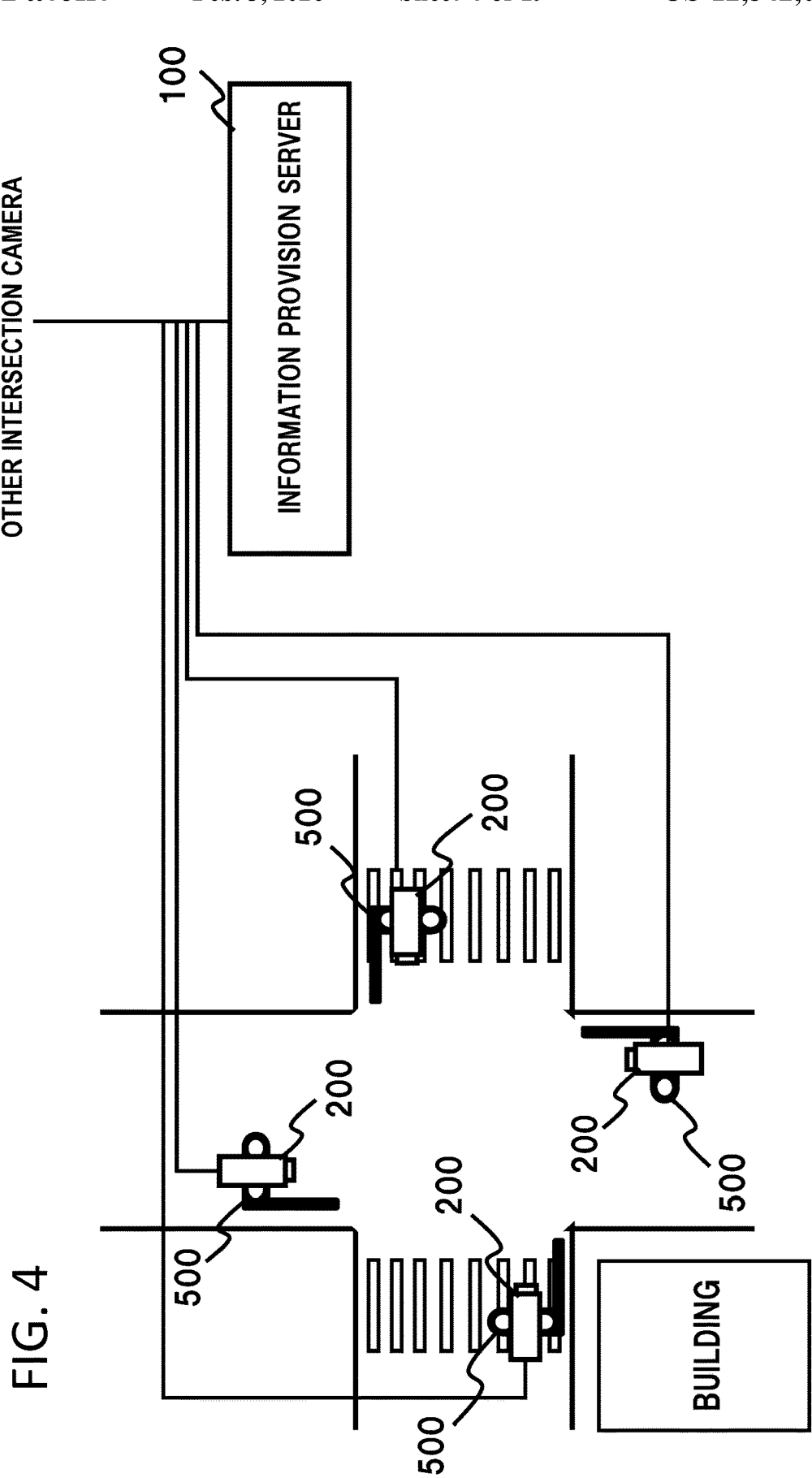
FIG. 4 is a diagram showing an example of fixed-point camera arrangements used in the first example embodiment of the invention.

FIG. 4 illustrates an example arrangement of the fixed-point camera(s) 200 used in the first example embodiment of the invention. In the following embodiment, the fixed-point camera 200 will be described as a camera mounted to a traffic light 500 at an intersection, as shown in FIG. 4. One of advantages of using such a camera mounted to the traffic light 500 is that, as illustrated in FIG. 4, the camera can be installed in a position where it has a bird's eye view of the traffic flow at the intersection, and an existing signal control system can be used as a power source and a means of communication. Of course, the fixed-point camera 200 is not limited to the camera mounted to the traffic light 500 shown in FIG. 4, but any other roadside camera can be used.

The first identification part 101 identifies passenger vehicles traveling on a road using images captured by the fixed-point camera(s) 200 as described above. At this time, instead of identifying all passenger vehicles traveling on the road, the first identification part 101 may identify whether or not a vehicle is a passenger vehicle, giving a priority to vehicle(s) in a particular lane, such as a travel lane on a sidewalk side of the road. This identification of passenger vehicles can also be done using a classifier that classifies types of vehicles over an area in which the vehicle is in the picture. Such a classifier can be generated in advance by machine learning. For example, it is enough to identify vehicles T1, T3, and T4 in the travel lane on the sidewalk side of the road shown in FIG. 5. The reason for this is that, in general, empty passenger vehicles are often running in the sidewalk-side travel lane in order to respond to a request from passengers to stop. Another reason is that the purpose of this system is to measure traveling frequency of empty passenger vehicles and present it to users, so information on passenger vehicles other than empty passenger vehicles is not necessary. This exclusion of passenger vehicles other than empty passenger vehicles from processing is also advantageous in terms of reducing load on the information provision server 100.

The second identification part 102 identifies a status of whether or not the passenger vehicle is empty using image(s) captured by the fixed-point camera(s) 200. Note that image referred to by the second identification part 102 may be the area image identified by the first identification part 101 as containing a passenger vehicle. In this way, the second identification part 102 can narrow down targets for identifying whether the vehicle is empty or not. The identification of whether the vehicle is empty or not can be made, for example, by identifying content of an indicator board on the passenger vehicle that indicates whether the vehicle is empty or not, which is captured by the fixed-point camera 200. This identification of empty passenger vehicle status can also be done by using a classifier that classifies the contents of the indicator board focused in the area where the display board of the vehicle is captured in the image. Such a classifier can be created in advance by machine learning. In some cases, lighting of lanterns and lanterns (company name display lights) on the roof of a vehicle may be used as a method to identify whether the vehicle is empty or not. In this case, since lighting rules for lanterns (company name indicator lights) differ depending on passenger vehicle operator companies, the operator companies are also identified by the body color and the shape and letters on the lanterns (company name indicator lights), and a comprehensive judgment is made.

The traveling frequency measuring part 105 measures traveling frequency of empty passenger vehicles by calculating number of empty passenger vehicles per unit time for each predetermined road segment set in the service-target area. For example, if three passenger vehicles pass a certain road segment in a unit time of one hour, the traveling frequency is 3. Of course, the unit time and traveling frequency are not limited to this, and various methods can be used. The predetermined road segment can be any segment, such as between intersections or at predetermined distances.

The map generating part 103 uses information obtained by the first identification part 101, the second identification part 102, and the traveling frequency measuring part 105 described above to generate a map capable of displaying a distribution of passenger vehicles in state by state in the service-target area described above. In this example embodiment, the traveling frequency measuring part 105 measures traveling frequency of empty passenger vehicles (hereinafter also referred to as "traveling frequency of empty vehicles") for each road segment in the service-target area. Therefore, in this example embodiment, the map of the service-target area stored in map information storing part 106 can be used to generate the map by adding the traveling frequency of empty passenger vehicles to a map of the service-target area stored in the map information storing part 106.

The transmitting part 104 transmits the map generated by the map generating part 103 in response to a request from a taxi-user or a terminal of a taxi-operator company.

The map information storing part 106 stores map information for the service-target area.

Figure 6:
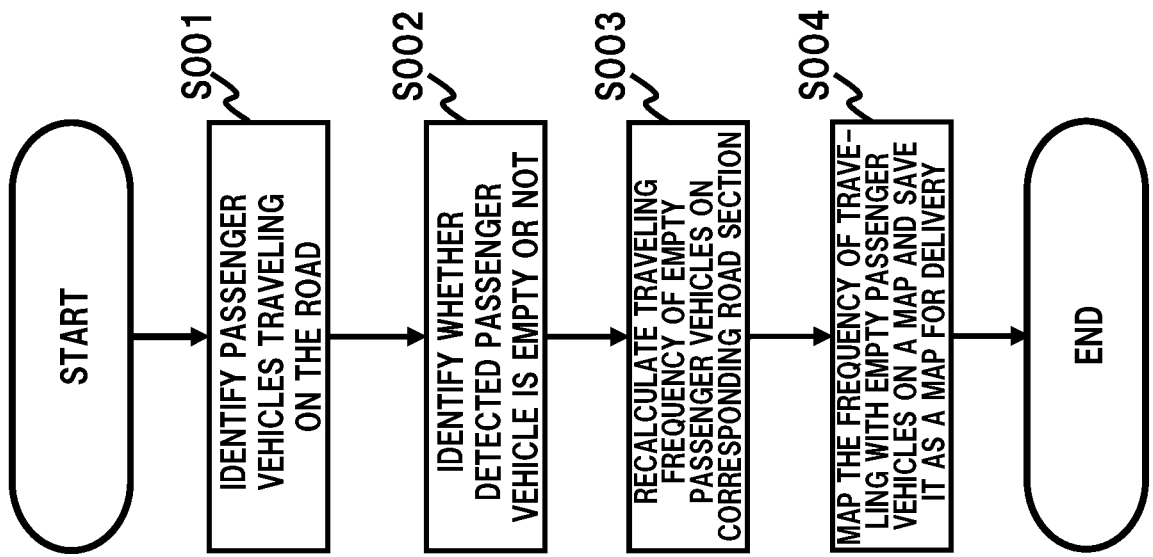
FIG. 6 is a diagram illustrating the operation of a first identification unit of the information provision server of the first example embodiment of the invention.

Next, operations of this example embodiment will be described in detail with reference to the drawings. FIG. 6 is a flow chart illustrating operations of the information provision server 100 of the first example embodiment of the invention. According to FIG. 6, first, the information provision server 100 identifies passenger vehicles traveling on the road from image(s) obtained by the fixed-point camera(s) 200 (step S001).

Next, the information provision server 100 identifies whether or not the detected passenger vehicle is empty (step S002).

Next, the information provision server 100 recalculates the traveling frequency of empty vehicles on a corresponding road segment using the results of the detected identification of whether or not a passenger vehicle is empty (step S003).

Next, the information provision server 100 maps the calculated traveling frequency of empty passenger vehicles on the road segment calculated above on a map of the service-target area and stores it as a map for delivery (step S004).

By repeating above process, passenger vehicles in the service-target area are detected and the traveling frequency of empty passenger vehicles is updated. The information provision server 100 delivers the map for delivery generated by the above procedure in response to a request from a taxi-user or a terminal of a taxi-operator company (hereinafter referred to as a "terminal").

Figure 7:
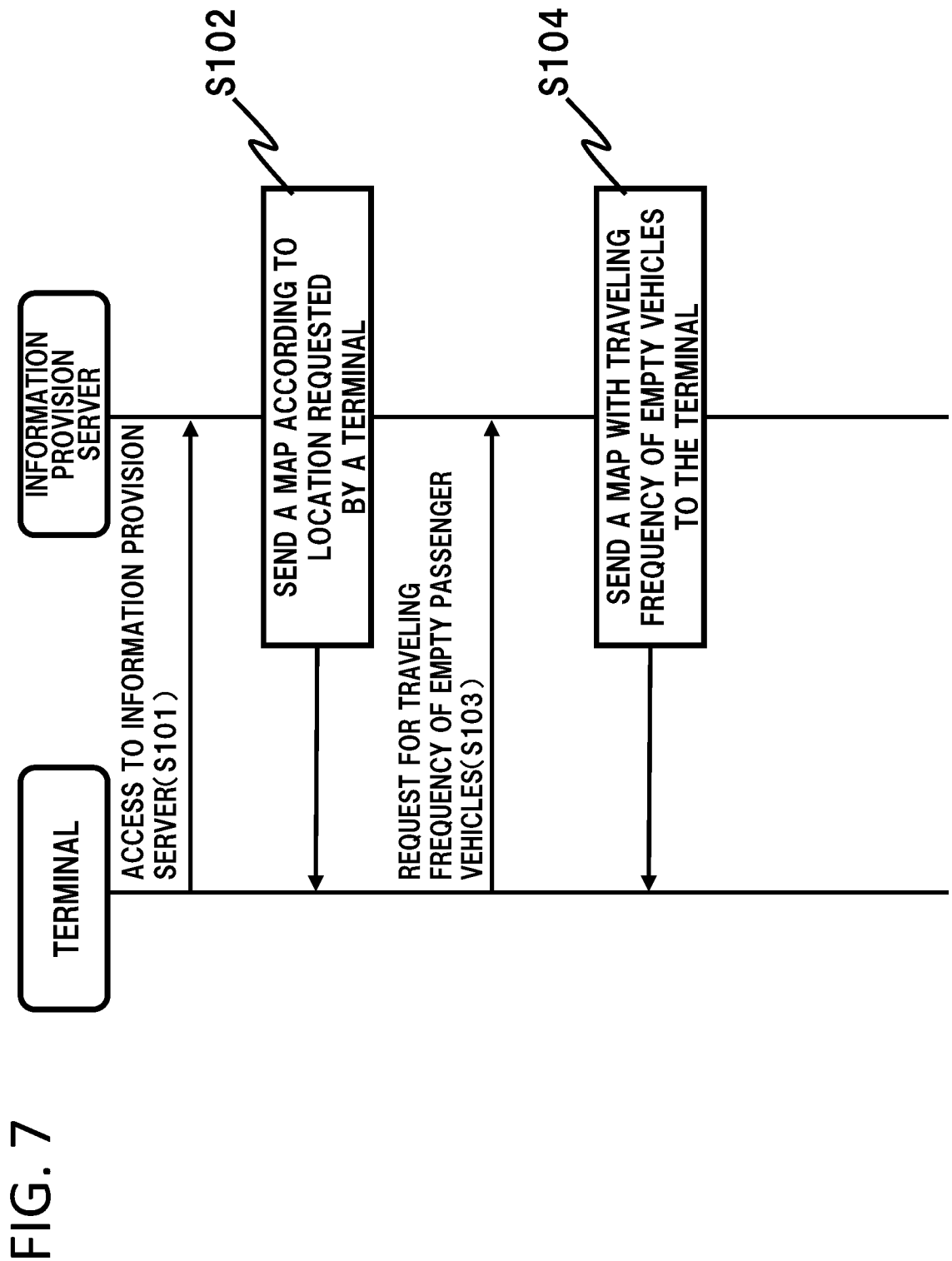
FIG. 7 is a sequence diagram illustrating information provision operations of the information provision server of the first example embodiment of the invention.

FIG. 7 is a sequence diagram illustrating information provision operations of the information provision server 100. According to FIG. 7, first, when a terminal accesses the information provision server 100 (step S101), the information provision server 100 sends a map according to a location requested by a terminal (step S102). Here, the location requested by the terminal may be a location obtained by the terminal's location information acquisition method, such as GPS (Global Positioning System).

Furthermore, when the terminal requests the information provision server 100 for traveling frequency of empty passenger vehicles (step S103), the information provision server 100 sends a map with traveling frequency of empty vehicles to the terminal (step S104).

Figure 8:
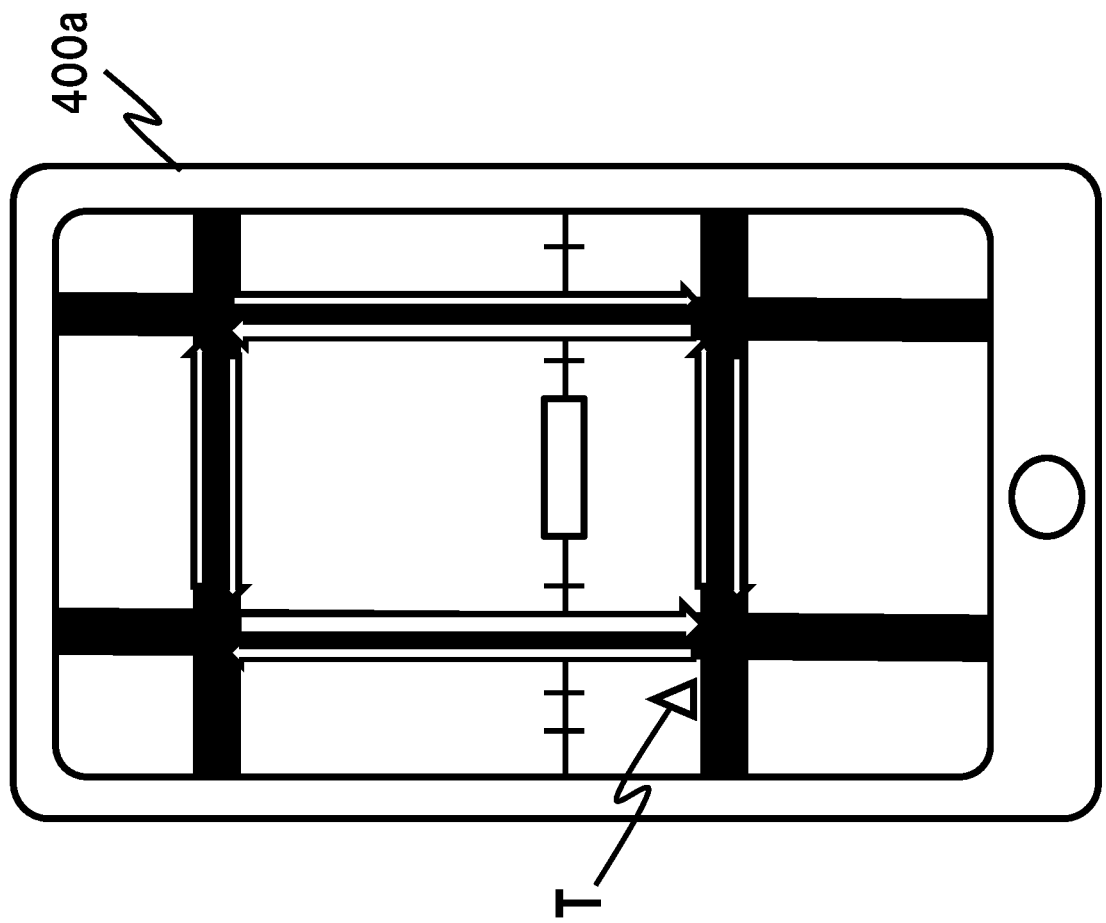
FIG. 8 is an example of a map sent to a terminal by the information provision server of the first example embodiment of the invention.

FIG. 8 shows an example of a map with traveling frequency of empty passenger vehicles sent to a terminal by the information provision server 100. In the example in FIG. 8, "T" indicates current location of the terminal. The thickness of arrow line along roads indicates the traveling frequency of empty passenger vehicles. For example, in the example in FIG. 8, arrow lines on the opposite side of the road are thicker than those on the current location side of the road, which extends north-south near the terminal's current location. In this case, it would be easier for a user to find a passenger vehicle by crossing the road and moving to the sidewalk on the opposite side of the road. Note that the example in FIG. 8 shows only the traveling frequency of empty vehicles on the map, but it is of course possible to provide a map plotting the location of detected passenger vehicles, for example, as shown in the right-hand side figure in FIG. 2.

Second Example Embodiment

In the first example embodiment described above, the most recent traveling frequency of empty vehicles was provided, but it is also possible to store the traveling frequency of empty vehicles measured in the past and provide it to user. Next, the second example embodiment, in which the traveling frequency of empty passenger vehicles can be provided according to arbitrary conditions specified by user, will be described. The configuration and operation of the second example embodiment are almost the same as those of the first example embodiment, so the following description will focus on the differences.

Figure 9:
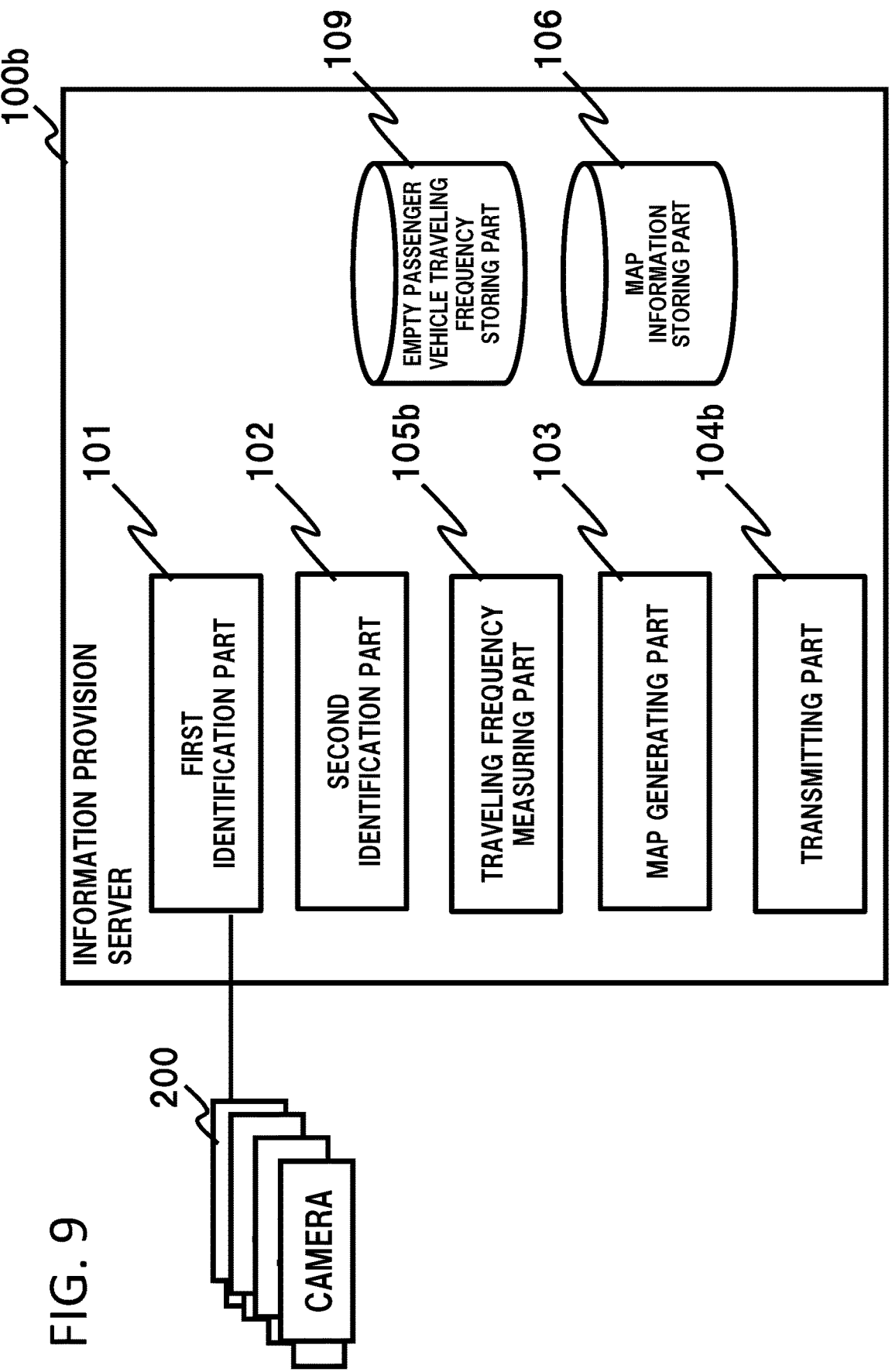
FIG. 9 is a block diagram illustrating a configuration of an information provision server in a second example embodiment of the invention.

FIG. 9 illustrates a block diagram of information provision server 100*b* of the second example embodiment of the invention. The difference from the information provision server 100 of the first example embodiment shown in FIG. 3 is in that the information provision server 100*b* has an additional empty passenger vehicle traveling frequency storing part 109.

The traveling frequency measuring part 105*b* measures the traveling frequency of empty vehicles, separately counts the empty passenger vehicle detected at predetermined time intervals, and stores the traveling frequency of empty passenger vehicles by specific time periods in the empty passenger vehicle traveling frequency storing part 109.

FIG. 10 shows an example of the traveling frequency of empty vehicles information maintained in the empty passenger vehicle traveling frequency storing part 109. In the example in FIG. 10, the hourly traveling frequency of empty vehicles in the measurement section (road section) of service-target area is recorded. In the example in FIG. 10, the traveling frequency of empty vehicles is illustrated for measurement section (road section) as Intersection A—Intersection B. However, the traveling frequency of empty vehicles is recorded for other measurement sections (road sections) in the same way.

A transmitting part 104*b* reads the traveling frequency of empty passenger vehicles information that meets conditions (time unit, time of day, day of the week) requested by a terminal, overlays it on map information, and operates to transmit the map to the terminal.

Figure 11:
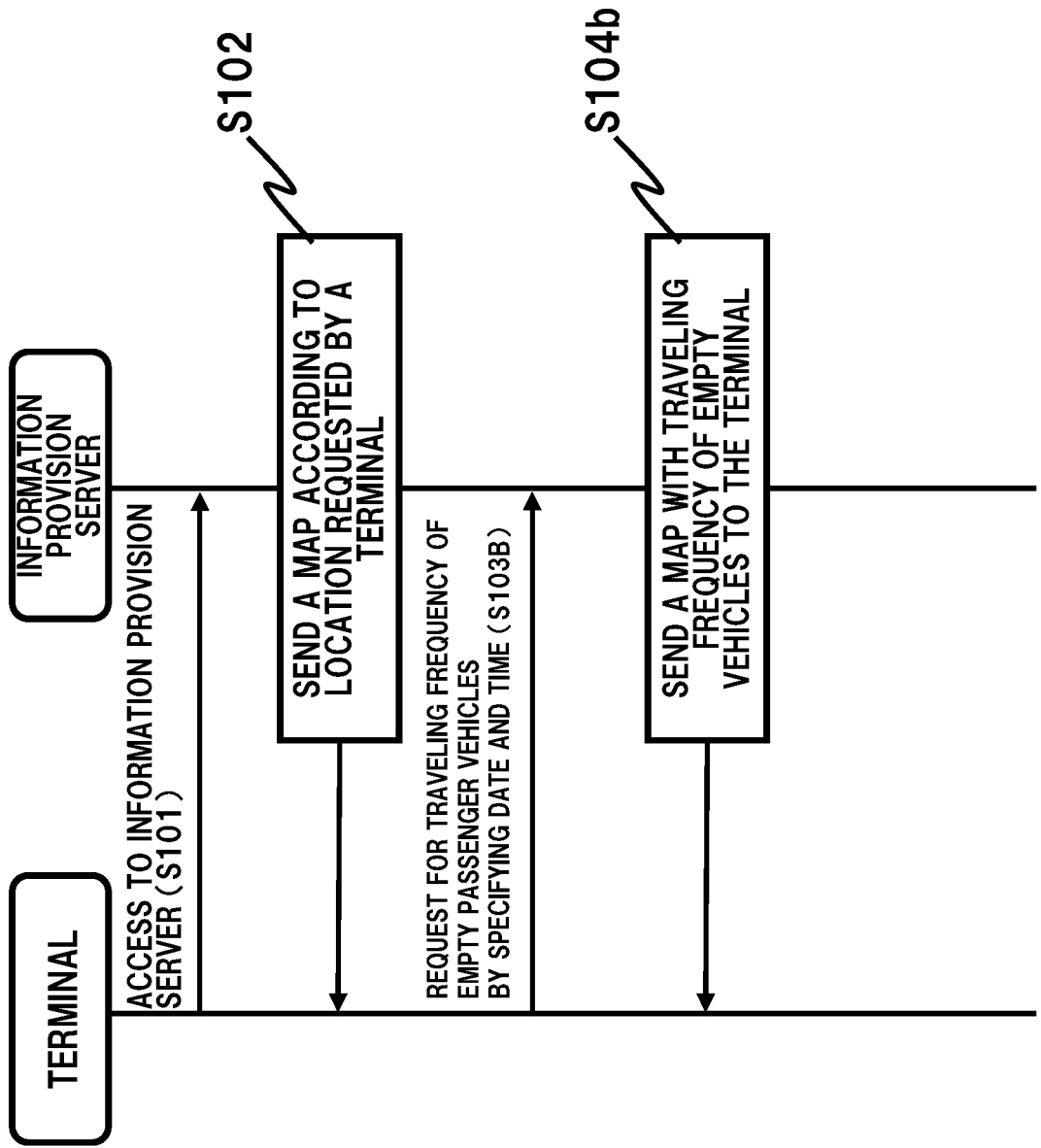
FIG. 11 is a sequence diagram illustrating information provision operations of the information provision server of the second example embodiment of the invention.

Operations of this example embodiment are next described in detail with reference to the drawings. FIG. 11 is a flowchart representing the operation of the information provision server 100*b* in this example embodiment. The operations of steps S101-S102 in FIG. 11 are the same as in the first example embodiment, so explanation is omitted.

In step S103*b*, when a terminal requests the information provision server 100*b* for the empty driving frequency by specifying a date and time (step S103*b*), the information provision server 100*b* sends to the terminal a map attached with the empty traveling frequency for the date and time specified by the terminal (step S104*b*).

Figure 12:
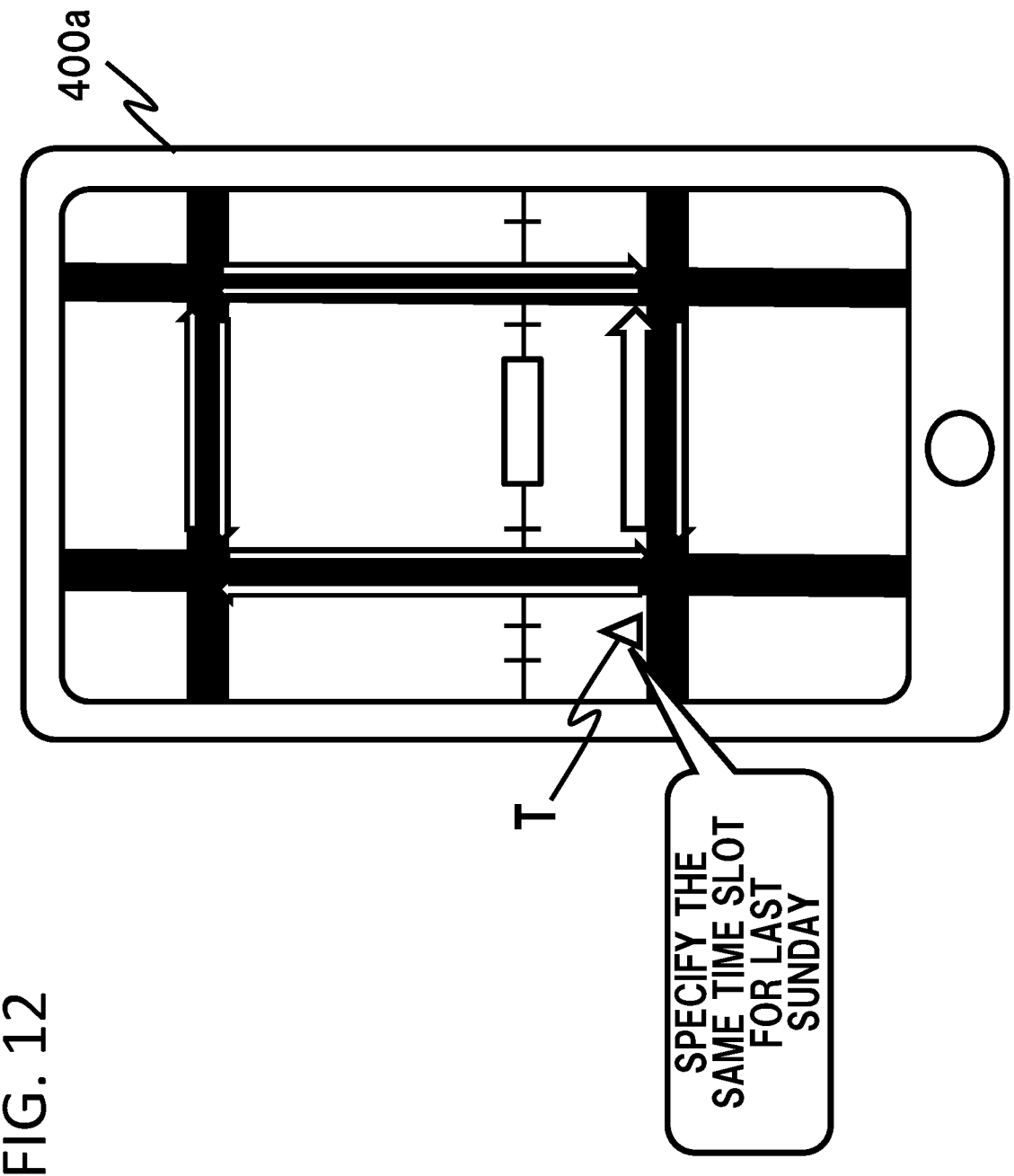
FIG. 12 is an example of a map sent to a terminal by the information provision server of the second example embodiment of the invention.

FIG. 12 illustrates an example of a map with traveling frequency of empty passenger vehicles sent by the information provision server 100*b* to a terminal. In the example in FIG. 12, the terminal requested a map with traveling frequency of empty passenger vehicles for the same time period last Sunday. In the example in FIG. 12, arrow lines on the north side of the road extending to the right (east) of the terminal T's location are thicker, indicating a higher traveling frequency of empty passenger vehicles. In this case, it would be easier for the user to find passenger vehicles if they crossed the road to the east, went straight ahead, and moved to the sidewalk along that line. As described above, this example embodiment makes it possible to refer not to current traveling frequency of empty vehicles, but to the traveling frequency of empty vehicles on any given day of the week and time in the past, and to move to a location where it is easier to find passenger vehicles at any given point in the future.

In the above example, it is assumed that terminal requests a map with traveling frequency of empty passenger vehicles by specifying date and time. For example, a terminal may request the traveling frequency of empty passenger vehicles by specifying a time unit ("aggregation unit") such as every 3 hours or every 6 hours. In this case, the information provision server 100*b* should aggregate the traveling frequency of empty vehicles shown in FIG. 11 and provide a map showing the traveling frequency of empty passenger vehicles every 3 or 6 hours. If the measurement section (road section) for calculating the traveling frequency of empty vehicles is also measured in a more detailed section, it is possible to provide the traveling frequency of empty passenger vehicles in any section specified by the terminal.

The above map attached with traveling frequency of empty vehicles can also be provided to drivers of passenger vehicles who search for passengers on any route, so-called "idle-traveling business". These drivers can refer to the map with the traveling frequency of empty passenger vehicles to generate a route for their idle-traveling business that avoids streets with many competing vehicles and patrols streets with few competing vehicles.

Furthermore, the information provision server 100*b* may record statistical information such as location and number of times this map attached with traveling frequency of empty passenger vehicles has been viewed by taxi-users, etc. In this case, the information provision server 100*b* may provide such statistical information to the terminals of taxi-operator companies, etc., either together with the map or as statistical information by itself.

Third Example Embodiment

In the first and second example embodiments described above, the traveling frequency of empty vehicles is provided as an indicator for finding passenger vehicles, but the indicator that can be provided to terminals is not limited to the traveling frequency of empty vehicles. Next, a third example embodiment is described in which the empty passenger vehicle rate, which indicates the percentage of passenger vehicles that are empty among the passenger vehicles that have traveled a certain section, can be provided. Configuration and operation of the third example embodiment are almost the same as those of the first example embodiment, so the following description will focus on the differences.

Figure 13:
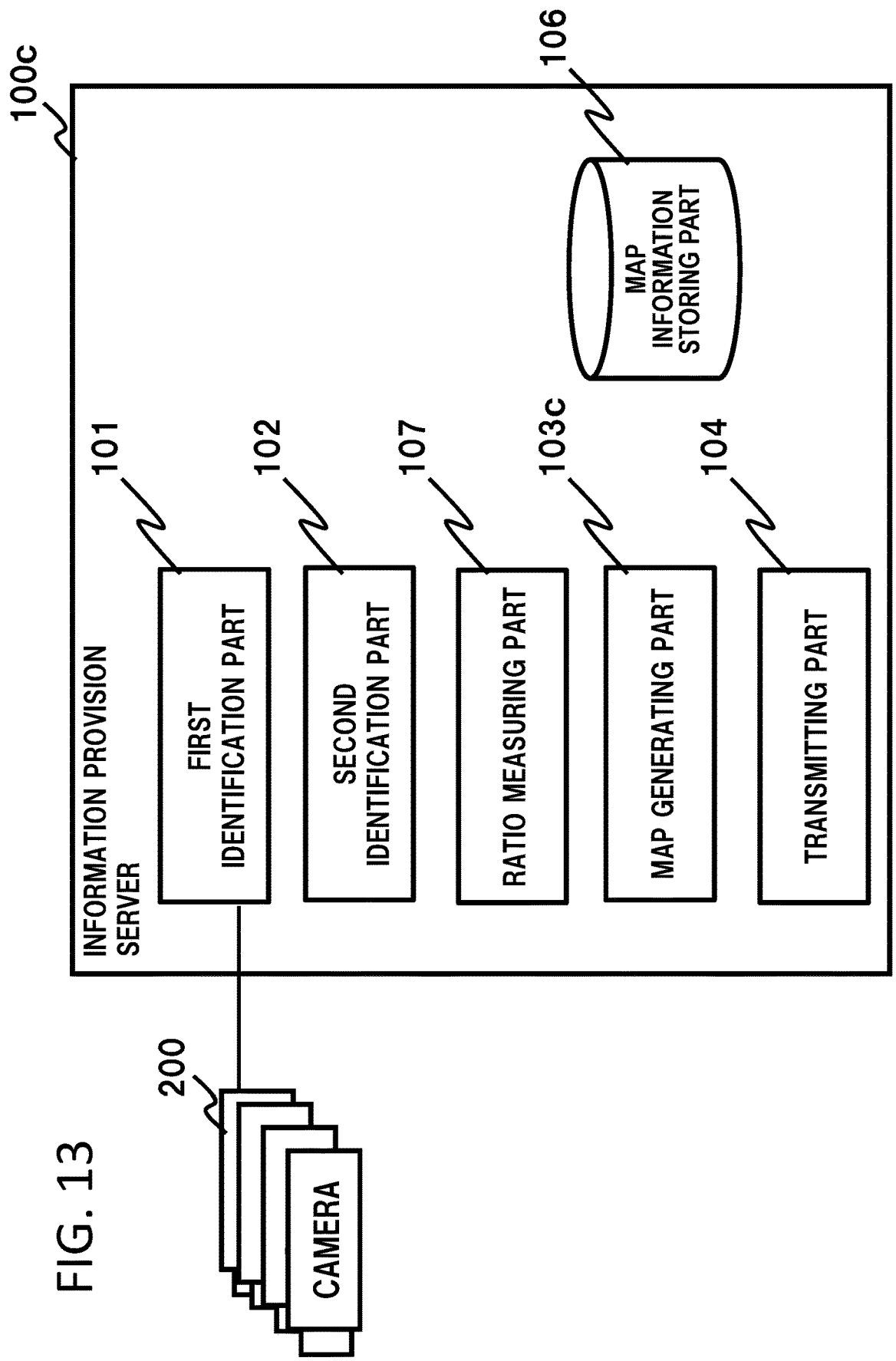
FIG. 13 is a block diagram illustrating a configuration of an information provision server in a third example embodiment of the invention.

FIG. 13 shows a block diagram of the information provision server 100c of the third example embodiment of the invention. The difference from the information provision server 100 of the first example embodiment shown in FIG. 3 is in that the information provision server 100c is equipped with a ratio measuring part 107 instead of a traveling frequency measuring part 105.

The ratio measuring part 107 counts overall number of passenger vehicles and a number of empty passenger vehicles in the past predetermined time, respectively, and calculates a percentage of empty passenger vehicles. The percentage of empty passenger vehicles can be defined, for example, by the following equation.

Figure 14:
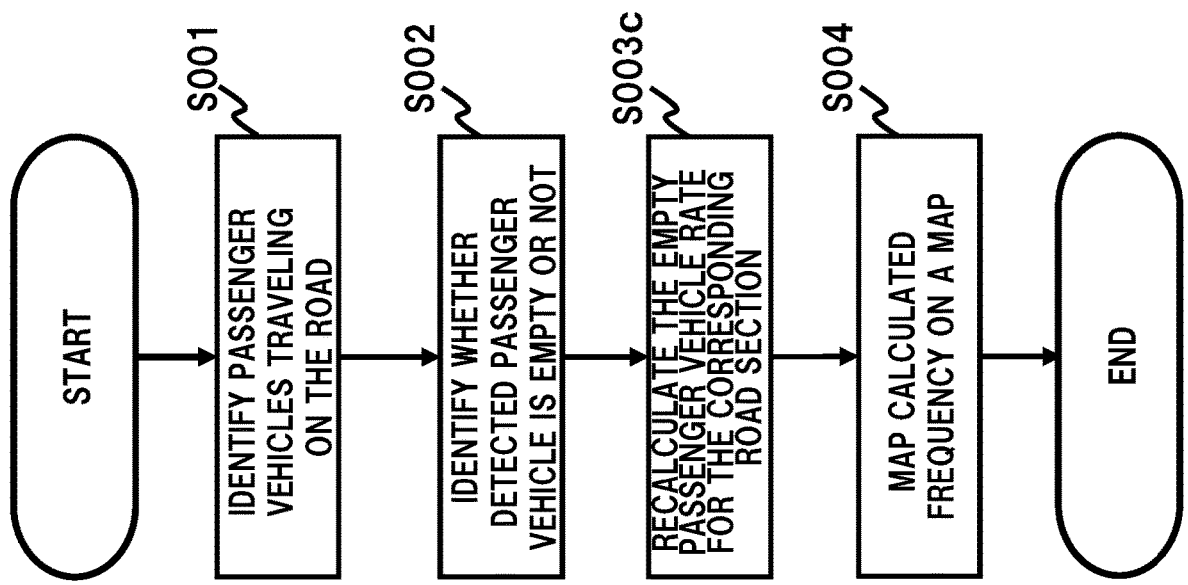
FIG. 14 is a flow chart illustrating operations of the information provision server of the third example embodiment of the invention.

Empty rate=number of empty passenger vehicles/ total number of passenger vehicles Next, operations of this example embodiment will be described in detail with reference to the drawings. FIG. 14 is a flowchart illustrating operations of the information provision server 100c of the third example embodiment of the invention. The difference from the operation of the information provision server 100 of the first example embodiment shown in FIG. 6 is in that in step S003c, the information provision server 100c recalculates the empty passenger vehicle rate for a corresponding road section using a detected identification result of whether or not the passenger vehicle is empty. Other operations are the same as in the first example embodiment and are therefore omitted.

Figure 15:
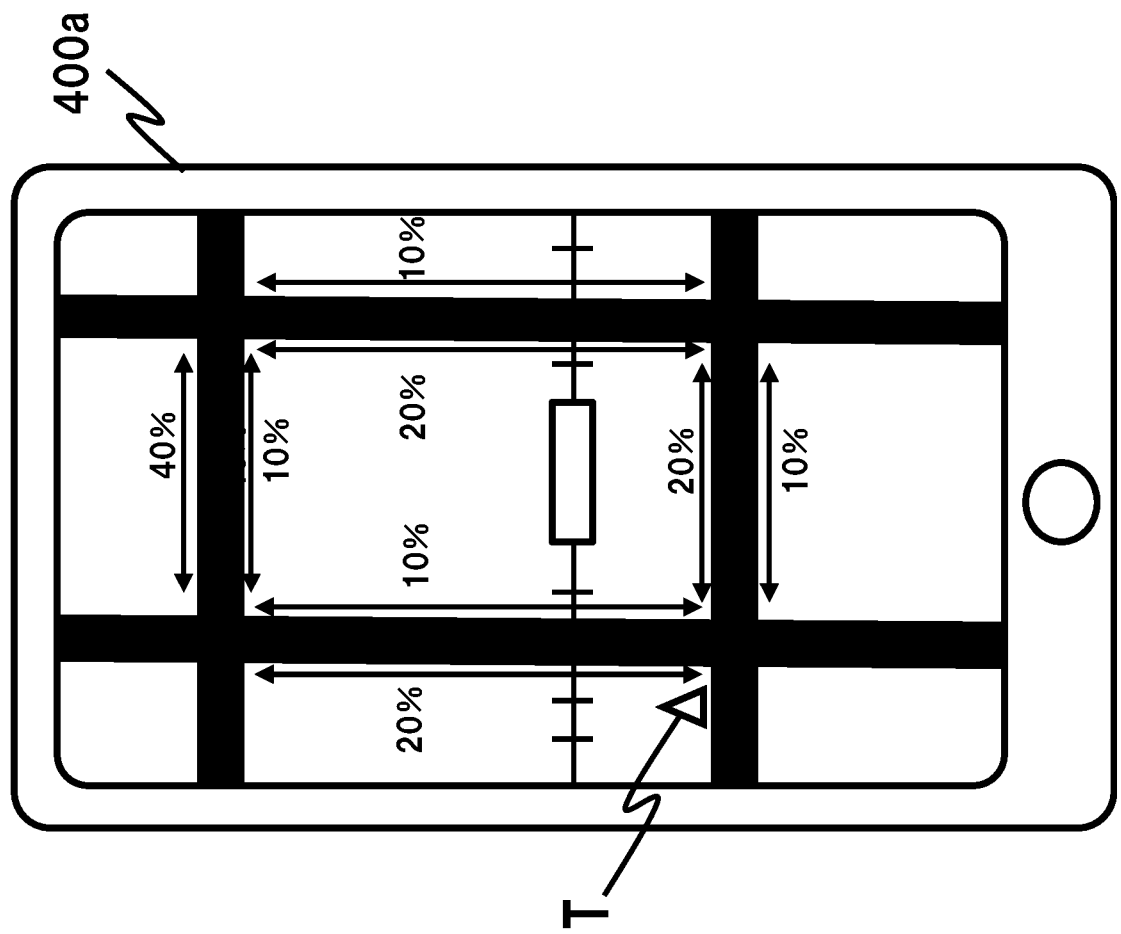
FIG. 15 is an example of a map sent to a terminal by the information provision server of the second example embodiment of the invention.

FIG. 15 shows an example of a map with empty passenger vehicles sent to a terminal by the information provision server 100c. In the example in FIG. 15, the sign T indicates a current location of the terminal. The percentage of empty passenger vehicles is indicated by the arrows along the road. For example, in the example in FIG. 15, the percentage of empty vehicles near the terminal's current location is between 10% and 20%, indicating that the percentage of empty passenger vehicles is low even if a passenger vehicle is found. On the other hand, one block to the north of terminal T, on the north side of the east-west road, the vacancy rate is 40%, indicating a relatively high percentage of empty passenger vehicles. In this case, users are more likely to find passenger vehicles if they move north from their current location to the sidewalk of the road where the empty passenger vehicle rate is 40%.

In the above example, the empty passenger vehicle ratio is provided, but it can be modified so that the ratio measuring part 107 measures the occupied passenger vehicle ratio and provides a map with an occupied passenger vehicle ratio. Such a map with the occupied passenger vehicle rate can be used as a basic data for vehicle dispatch planning of a taxi-operator company and as a management indicator.

The above maps with empty passenger vehicles and/or maps with occupied passenger vehicles can also be provided to drivers of passenger vehicles who search for passengers along arbitrary routes, so-called "idle-traveling routes". These drivers can refer to the maps with empty passenger vehicles and maps with occupied passenger vehicles to generate a route for their idle-traveling business that avoids streets with many competing vehicles and patrols streets with few competing vehicles.

Furthermore, the information provision server 100c may record statistical information such as the location and number of times that taxi-users, etc. have viewed the above maps with empty passenger vehicle rates and maps with occupied passenger vehicle rates. In this case, the information provision server 100c may provide such statistical information to taxi-operator companies, etc. at their terminals, either together with these maps or as statistical information by itself.

Note that for the third example embodiment, as in the second embodiment, an empty passenger vehicle rate storage part and occupied passenger vehicle rate storage part may be added to the information provision server 100c to store the empty passenger vehicle rate and occupied passenger vehicle rate. Then, by causing the server to perform the same operation as in the second example embodiment, it is possible to provide maps with empty passenger vehicle rates and maps with occupied passenger vehicle rates for any given date and time and measurement section (road section).

Fourth Example Embodiment

Next, a fourth example embodiment, which adds a function to aggregate locations where users have requested a map and provide it to terminals, will be described. Configuration and operation of the fourth example embodiment are almost the same as those of the first embodiment, so the following description will focus on the differences.

Figure 16:
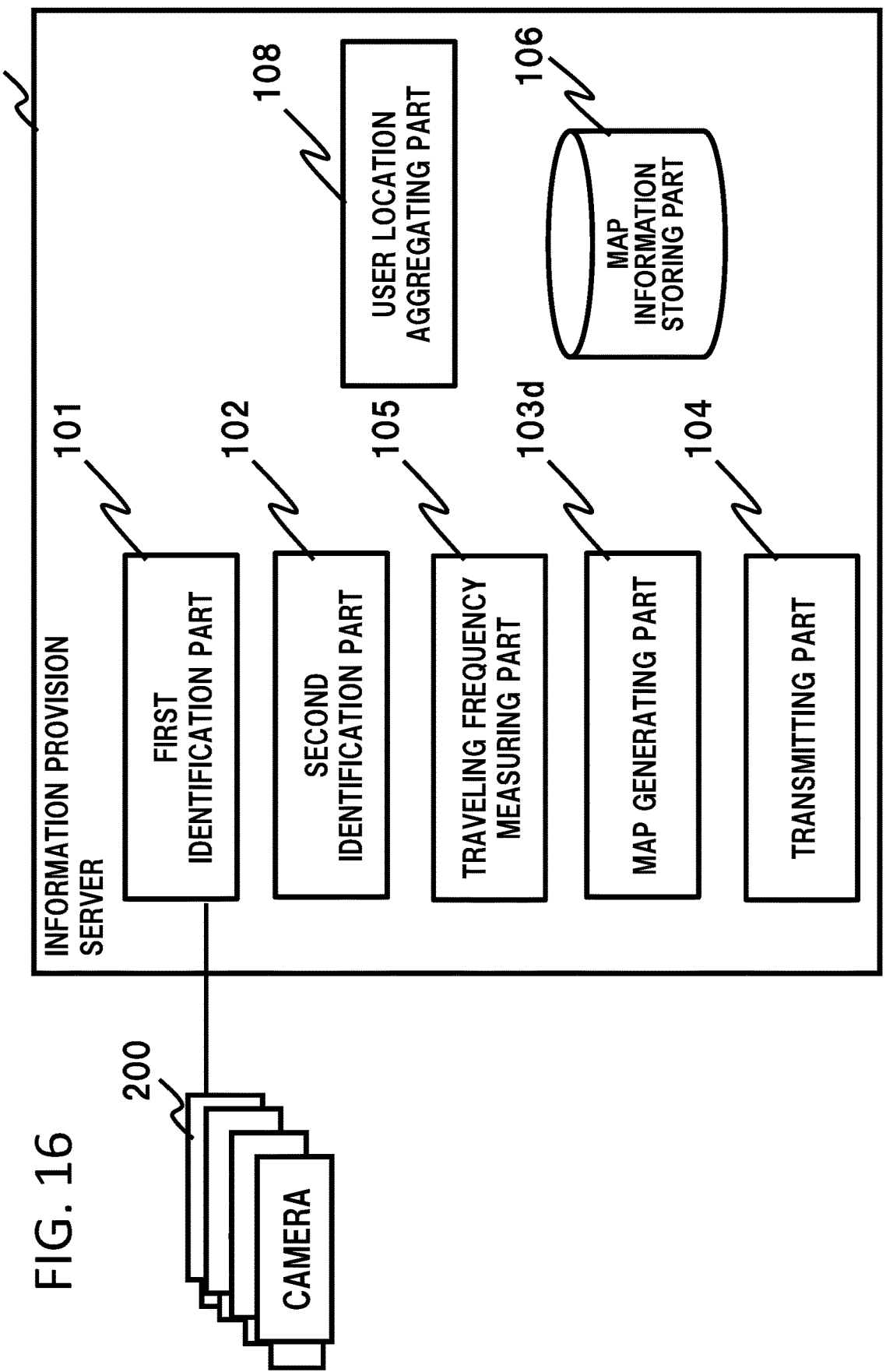
FIG. 16 is a block diagram illustrating a configuration of an information provision server in a fourth example embodiment of the invention.

FIG. 16 illustrates a block diagram of information provision server 100d of the fourth example embodiment of the invention. The difference from the information provision server 100 of the first example embodiment shown in FIG. 3 is in that the information provision server 100d has an additional user location aggregating part 108.

When the user location aggregating part 108 receives a request for a map from a terminal, it records location and records it at predetermined time intervals.

The map generating part 103d creates a map capable of displaying the distribution of users in the service-target area described above, using the information about the location requested by the terminal for the map, which is aggregated by the user location aggregating part 108.

Figure 17:
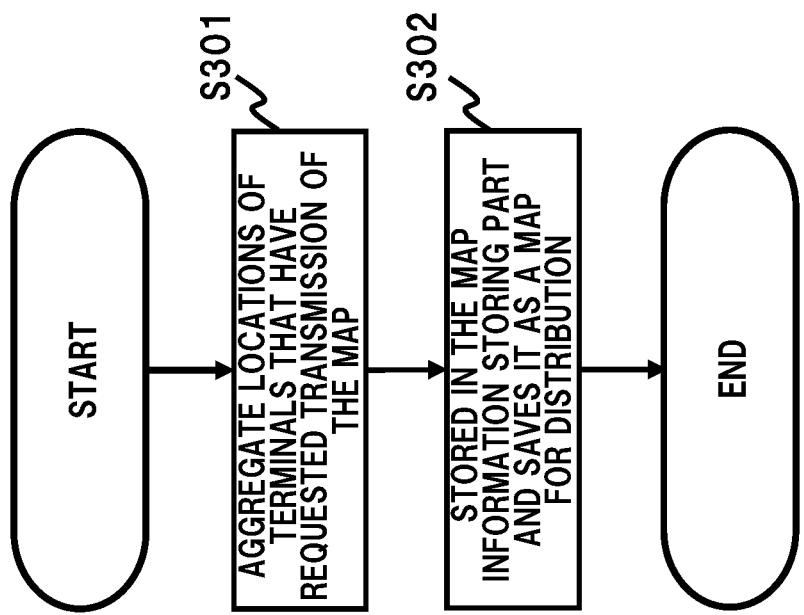
FIG. 17 is a flow chart illustrating additional operations of the information provision server of the fourth example embodiment of the invention.

The following is a description of operations that are added to the first example embodiment in the operation of this example embodiment. FIG. 17 is a flowchart illustrating the additional operations of the information provision server 100d in the fourth example embodiment of the invention.

The information provision server 100d aggregates locations of terminals that have requested transmission of the map at predetermined time intervals (step S301).

The information provision server 100d maps the aggregated terminal locations described above on the map information stored in the map information storing part and saves it as a map for delivery (step S302). This map for delivery may be a map with traveling frequency of empty passenger vehicles or a map without traveling frequency of empty vehicles.

Figure 18:
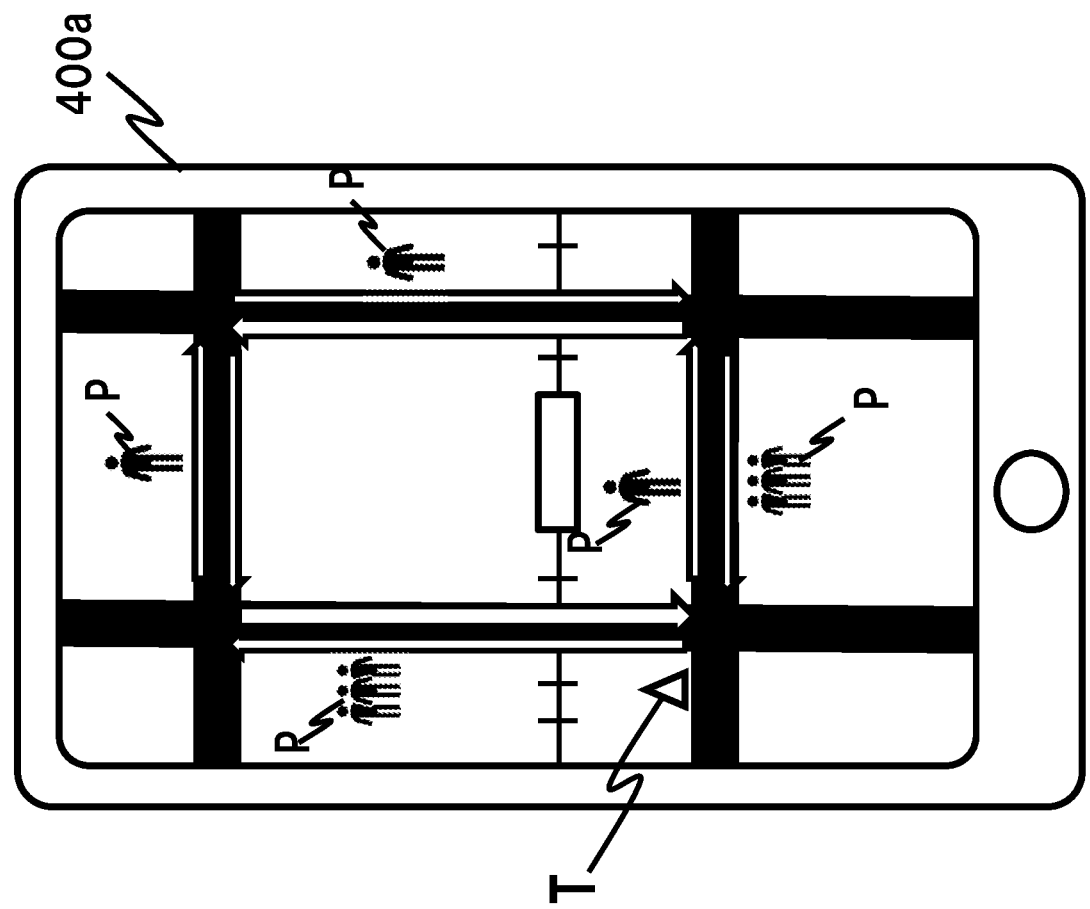
FIG. 18 is an example of a map sent to a terminal by the information provision server of the fourth example embodiment of the invention.

FIG. 18 shows an example of a map with terminal locations and traveling frequency of empty passenger vehicles sent to terminals by the information provision server 100d. In the example in FIG. 18, in addition to arrow lines indicating the traveling frequency of empty vehicles for each road segment, numbers of terminals that have requested the map to be sent are indicated by a human-shaped icon P. A street with many of these human-shaped icons P indicates that there are many users looking for passenger vehicles, i.e., many users who are rivals for a given user. The user of terminal T can refer to the number of these rivals in addition to the traveling frequency of empty vehicles on each road segment displayed and move to a location where it is easier to find passenger vehicles. For example, in the example in FIG. 18, the arrow line on the opposite side of road is thicker than the arrow line on the side of the terminal's current location. Furthermore, there is no terminal on the other side of the road that requested the map. In this case, it would be easier for the user to cross the road and move to the sidewalk on the other side of the road to find a passenger vehicle.

Each example embodiment of the invention has been described above. The invention is not limited to the embodiments described above, but further variations, substitutions, and adjustments can be made to the extent that they do not depart from the basic technical idea of the invention. For example, the form of expression of the device configuration, configuration of each element, data, etc. shown in each drawing is an example to facilitate understanding of the invention, and is not limited to the configuration shown in these drawings.

For example, the above example embodiments are described as detecting moving passenger vehicles, but it is also possible to focus on stopped passenger vehicles, count number of such vehicles, and provide the count to the terminal. If there are stopped passenger vehicles, there is a high possibility that a passenger can board a passenger vehicle if he/she goes to that location. A function may be added to collect such information with the fixed-point camera(s) 200 and provide it to the terminal along with the map of each of the above example embodiments.

More concretely, the above function can be realized by adding a third identification part to the information provision server that detects passenger vehicles that are empty and parked on a shoulder of the road waiting for passengers. In this case, the map generating part uses the information identified by the third identification part to generate a map capable of displaying passenger vehicles in the waiting state in the service-target area. The transmitting part then transmits the map capable of displaying the passenger vehicles in the waiting state within the service-target area to the terminal.

In the example embodiments described above, it is assumed that the passenger vehicle is a manned taxicab or the like, but the passenger vehicle may also be an unmanned passenger vehicle.

Figure 19:
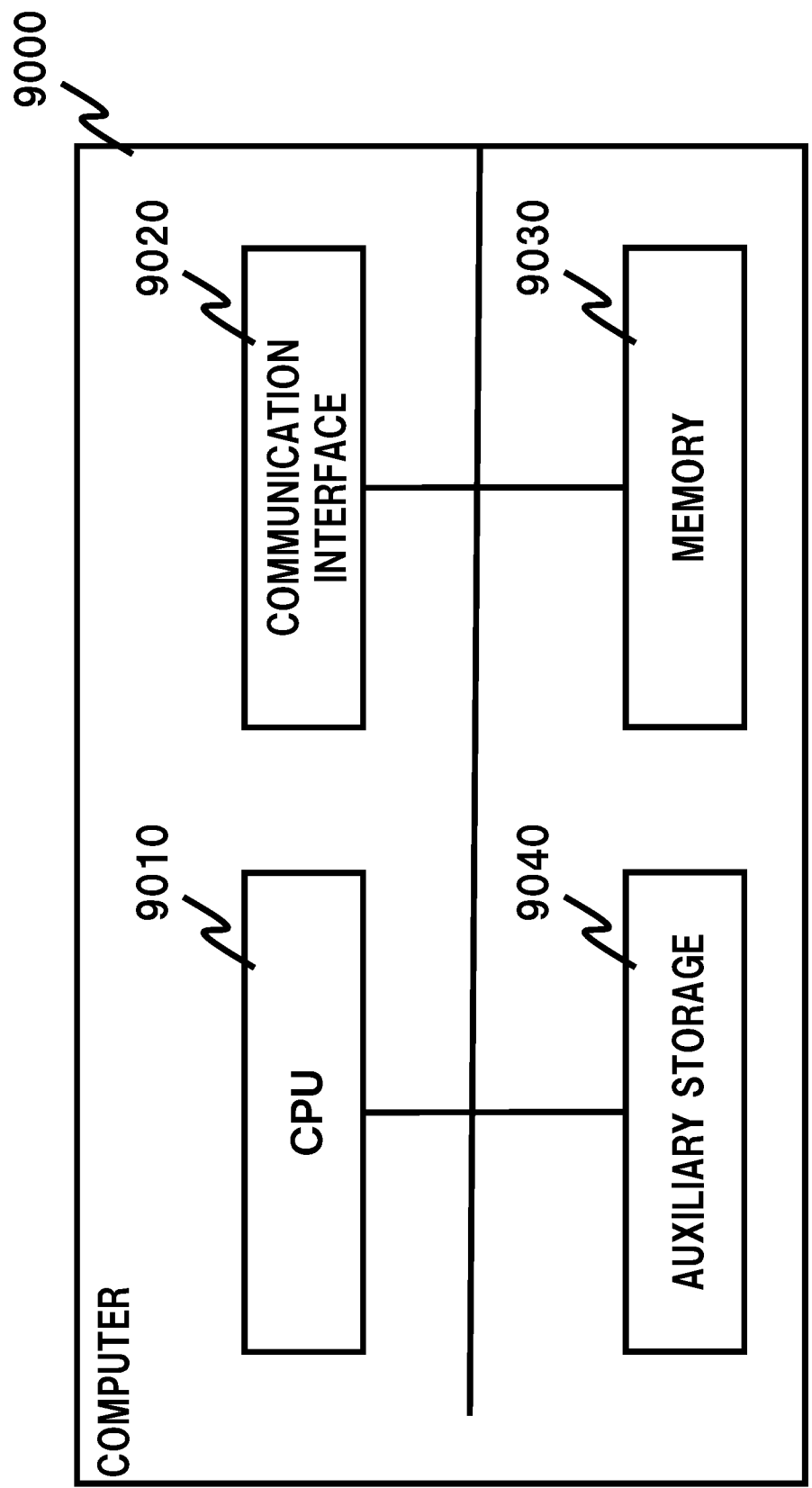
FIG. 19 is a diagram illustrating a configuration of a computer that can function as an information provision server of the invention.

The procedures shown in each of the above example embodiments can be realized by a program that allows a computer (9000 in FIG. 19) to function as an information provision server. Such a computer is exemplified in FIG. 19 in a configuration with a central processing unit (CPU) 9010, a communication interface 9020, a memory 9030, and an auxiliary storage 9040. In other words, the vehicle identification program and the map generation program can be executed by the CPU 9010 of FIG. 19.

That is, each part (processing part and functions) of the information provision system 100a and information provision servers 100b to 100d described above can be realized by a computer program that causes a processor installed in these devices to execute each of the above processes using its hardware.

Finally, preferred forms of the invention are summarized.
[Note 1]
(Refer to the information provision system according to the first aspect above)

[Note 2]
The information provision system further comprises:
a traveling frequency measuring part that measures traveling frequency of empty passenger vehicles for each predetermined road section set in the service-target area using the result of identification by the second identification part;
wherein the map generating part generates a map that can indicate the traveling frequency of empty passenger vehicles for each road section within the service-target area.

[Note 3]
The information provision system further comprises:
a ratio measuring part that measures ratio of empty or occupied passenger vehicles among passenger vehicles traveling on each predetermined road sections in the service-target area using the information identified by the second identification part,
wherein the map generating part generates a map that can display the ratio for each road section in the service-target area.

[Note 4]
In the information provision system, it is possible to specify a time unit to measure traveling frequency of the empty passenger vehicles, or a ratio of the empty or occupied passenger vehicles of the traveling passenger vehicles.

[Note 5]
In the information provision system, it is possible to specify day of week or time range to measure traveling frequency of empty passenger vehicles, or a ratio of empty or occupied passenger vehicles among the traveling passenger vehicles.

[Note 6]
In the information provision system, the first identification part identifies passenger vehicles that are traveling on a specific lane in the image(s) captured by the fixed-point camera(s), giving a priority to the vehicles in the specific lane, and the second identification part identifies state whether or not the passenger vehicle is empty from the image(s) of the passenger vehicle identified by the first identification part.

[Note 7]
In the information provision system, the system further comprises:
a part that specifies location of the predetermined terminal,
wherein the transmitting part transmits the map in response to a request from the predetermined terminal, and comprises a function that provides information regarding location of the predetermined terminal that requests the map in addition to the map.

[Note 8]
In the information provision system, the system further comprises:
a third identification part that detects passenger vehicles waiting for passengers that are parked on a shoulder of the road in an empty state,
wherein the map generating part generates a map that can display the passenger vehicles waiting for passengers in the service-target area using the information identified by the third identification part.

[Note 9]
(Refer to the method for providing information of passenger vehicles according to the second aspect.)

[Note 10]
(Refer to the program according to the third aspect.)

The disclosure of each Patent Literature cited above is incorporated herein in its entirety by reference thereto and can be used as a basis or a part of the present invention as needed. It is to be noted that it is possible to modify or adjust the example embodiments or examples within the scope of the whole disclosure of the present invention (including the Claims) and based on the basic technical concept thereof. Further, it is possible to variously combine or select (or partially omit) a wide variety of the disclosed elements (including the individual elements of the individual claims, the individual elements of the individual example embodiments or examples, and the individual elements of the individual figures) within the scope of the disclosure of the present invention. That is, it is self-explanatory that the present invention includes any types of variations and modifications to be done by a skilled person according to the whole disclosure including the Claims and the technical concept of the present invention. Particularly, any numerical ranges disclosed herein should be interpreted that any intermediate values or subranges falling within the disclosed ranges are also concretely disclosed even without explicit recital thereof. In addition, as needed and based on the gist of the present invention, partial or entire use of the individual disclosed matters in the above literatures that have been referred to in combination with what is disclosed in the present application should be deemed to be included in what is disclosed in the present application, as a part of the disclosure of the present invention.

REFERENCE SIGNS LIST 100, 100b, 100c, 100d: information provision server
100a: information provision system
101: first identification part
101a: first identification part
102: second identification part
102a: second identification part
103, 103c, 103d: map generating part
103a: map generating part
104, 104b: transmitting part
104a: transmitting part
105, 105b: traveling frequency measuring part
106: map information storing part
107: ratio measuring part
108: user location aggregating part
109: empty passenger vehicle traveling frequency storing part
200, 200a: fixed-point camera
300a: passenger vehicle
400a: predetermined terminal
500: traffic light
P: icon
T: terminal
T1-T4: vehicle
9000: computer
9010: CPU
9020: communication interface
9030: memory
9040: auxiliary storage

What is claimed is:

1. An information provision system, comprising:
   at least a processor; and
   a memory in circuit communication with the processor,
   wherein the processor is configured to execute program instructions stored in the memory to implement:
   a first identification part that is connected to a fixed-point camera(s) installed in a service-target area and identifies passenger vehicle(s) traveling on a road using an image captured by the fixed-point camera(s),
   a second identification part that distinguishes whether or not the passenger vehicle is empty using the image(s) captured by the fixed-point camera(s),
   a map generating part that generates a map including a distribution of passenger vehicles by status within the service-target area using the results of the identification by the first and second identification part;
   a transmitting part that transmits the map to a predetermined terminal; and
   a traveling frequency measuring part that measures traveling frequency of empty passenger vehicles for each predetermined road section set in the service-target area using the result of identification by the second identification part;
   wherein the map generating part generates the map that can indicate the traveling frequency of empty passenger vehicles for each road section within the service-target area, and
   wherein the traveling frequency is number of empty passenger vehicles per unit time for each predetermined road section.

2. The information provision system according to claim 1, further comprising:
   a ratio-measuring part that measures a ratio of empty or occupied passenger vehicles among passenger vehicles traveling on each of predetermined road sections in the service-target area using the information identified by the second identification part,
   wherein the map generating part generates a map that can display the ratio for each road section in the service-target area.

3. The information provision system according to claim 1, wherein it is possible to specify a time unit to measure the traveling frequency of the empty passenger vehicles, or a ratio of the empty or occupied passenger vehicles among the traveling passenger vehicles.

4. The information provision system according to claim 1, wherein it is possible to specify day of week or a time range to measure traveling frequency of empty passenger vehicles, or a ratio of empty or occupied passenger vehicles among the traveling passenger vehicles.

5. The information provision system according to claim 1, wherein the first identification part identifies passenger vehicles that are traveling on a specific lane in the image(s) captured by the fixed-point camera(s), giving a priority to the vehicles in this lane, and the second identification part distinguishes a state of whether or not the passenger vehicle is empty from the image of the passenger vehicle identified by the first identification part.

6. The information provision system according to claim 1, further comprising:
   a part that specifies location of the predetermined terminal,
   wherein the transmitting part transmits the map in response to a request from the predetermined terminal, and
   a function that provides information regarding location of the predetermined terminal that requested the map in addition to the map.

7. The information provision system according to claim 1, further comprising:
   a third identification part that detects a passenger vehicle(s) waiting for passenger(s) while parking on a shoulder of the road in an empty state,
   wherein the map generating part generates a map that can display the passenger vehicle(s) waiting for passengers in the service-target area using the information identified by the third identification part.

8. A method for providing information of passenger vehicles, wherein the method comprises:
with a fixed-point camera(s) installed in a service-target area and an information provision system connected to the fixed-point camera(s), identifying a passenger vehicle(s) traveling on a road using an image(s) captured by the fixed-point camera(s);
distinguishing a state of the passenger vehicle(s) whether or not it is empty using the image(s) captured by the fixed point camera(s);
measuring traveling frequency of empty passenger vehicles for each predetermined road section set in the service-target area using the result of distinguishing the state of the passenger vehicle(s);
generating a map that can display distribution of passenger vehicles by status in the service-target area using the information identifying the passenger vehicles and the state of whether or not the passenger vehicle is empty; and
transmitting the map to a predetermined terminal
wherein the map generated can indicate the traveling frequency of empty passenger vehicles for each road section within the service-target area and
wherein the traveling frequency is number of empty passenger vehicles per unit time for each predetermined road section.

9. A non-transitory computer-readable recording medium storing thereon a program configured to cause a computer to execute:
with a fixed-point camera(s) installed in a service-target area and a computer mounted on an information provision system connected to the fixed-point camera(s),
a process of identifying a passenger vehicle(s) traveling on a road using an image(s) captured by the fixed-point camera(s);
a process of measuring traveling frequency of empty passenger vehicles for each predetermined road section set in the service-target area using the result of the process of distinguishing the state of the passenger vehicle(s);
a process of distinguishing a state of the passenger vehicle whether or not it is empty using the image(s) captured by the fixed point camera(s);
a process of generating a map that can display distribution of passenger vehicles by status in the service-target area using the information identifying the passenger vehicle(s) and the state of whether or not the passenger vehicle is empty; and
a process of transmitting the map to a predetermined terminal
wherein the map generated can indicate the traveling frequency of empty passenger vehicles for each road section within the service-target area and
wherein the traveling frequency is number of empty passenger vehicles per unit time for each predetermined road section.

10. The information provision system according to claim 1, wherein
the first identification part identifies the passenger vehicle by using a classifier that classifies types of vehicles over an area in which the vehicle is in the picture.

11. The information provision system according to claim 2, wherein it is possible to specify a time unit to measure the traveling frequency of the empty passenger vehicles, or a ratio of the empty or occupied passenger vehicles among the traveling passenger vehicles.

12. The information provision system according to claim 2, wherein it is possible to specify day of week or a time range to measure traveling frequency of empty passenger vehicles, or a ratio of empty or occupied passenger vehicles among the traveling passenger vehicles.

13. The information provision system according to claim 2, wherein the first identification part identifies passenger vehicles that are traveling on a specific lane in the image(s) captured by the fixed-point camera(s), giving a priority to the vehicles in this lane, and the second identification part distinguishes a state of whether or not the passenger vehicle is empty from the image of the passenger vehicle identified by the first identification part.

14. The information provision system according to claim 3, wherein the first identification part identifies passenger vehicles that are traveling on a specific lane in the image(s) captured by the fixed-point camera(s), giving a priority to the vehicles in this lane, and the second identification part distinguishes a state of whether or not the passenger vehicle is empty from the image of the passenger vehicle identified by the first identification part.

15. The information provision system according to claim 4, wherein the first identification part identifies passenger vehicles that are traveling on a specific lane in the image(s) captured by the fixed-point camera(s), giving a priority to the vehicles in this lane, and the second identification part distinguishes a state of whether or not the passenger vehicle is empty from the image of the passenger vehicle identified by the first identification part.

16. The information provision system according to claim 2, further comprising:
a part that specifies location of the predetermined terminal,
wherein the transmitting part transmits the map in response to a request from the predetermined terminal, and
a function that provides information regarding location of the predetermined terminal that requested the map in addition to the map.

17. The information provision system according to claim 3, further comprising: a part that specifies location of the predetermined terminal, wherein the transmitting part transmits the map in response to a request from the predetermined terminal, and a function that provides information regarding location of the predetermined terminal that requested the map in addition to the map.

18. The information provision system according to claim 4, further comprising:
a part that specifies location of the predetermined terminal,
wherein the transmitting part transmits the map in response to a request from the predetermined terminal, and
a function that provides information regarding location of the predetermined terminal that requested the map in addition to the map.

19. The information provision system according to claim 5, further comprising:
a part that specifies location of the predetermined terminal,
wherein the transmitting part transmits the map in response to a request from the predetermined terminal, and a function that provides information regarding location of the predetermined terminal that requested the map in addition to the map.

20. The information provision system according to claim 2, further comprising:
a third identification part that detects a passenger vehicle(s) waiting for passenger(s) while parking on a shoulder of the road in an empty state,
wherein the map generating part generates a map that can display the passenger vehicle(s) waiting for passengers in the service-target area using the information identified by the third identification part.

* * * * *